(12) United States Patent
DeWind et al.

(10) Patent No.: US 11,969,773 B2
(45) Date of Patent: Apr. 30, 2024

(54) FUNNEL-AND-GATE WALL WITH A REPLACEABLE GATE WALL AND METHOD OF MAKING THE SAME

(71) Applicant: One Pass Innovators, LLC, Zeeland, MI (US)

(72) Inventors: Ryan DeWind, Zeeland, MI (US); Becky DeWind, Zeeland, MI (US)

(73) Assignee: ONE PASS INNOVATORS, LLC, Zeeland, MI (US)

( * ) Notice: Subject to any disclaimer, the term of this patent is extended or adjusted under 35 U.S.C. 154(b) by 0 days.

(21) Appl. No.: 17/692,081

(22) Filed: Mar. 10, 2022

(65) Prior Publication Data

US 2023/0286025 A1 Sep. 14, 2023

(51) Int. Cl.
*B09C 1/00* (2006.01)
(52) U.S. Cl.
CPC .................... *B09C 1/002* (2013.01)
(58) Field of Classification Search
CPC .......... C02F 2103/06; E02B 8/00; E02B 8/02; E02B 8/023; E02B 7/02; B09C 1/002
USPC ........................................................ 210/615
See application file for complete search history.

(56) References Cited

U.S. PATENT DOCUMENTS

| 6,102,622 A * | 8/2000 | Vinegar | E21B 43/305 |
| | | | 166/272.7 |
| 6,258,261 B1 * | 7/2001 | Zaluski | B09C 1/002 |
| | | | 210/170.07 |

FOREIGN PATENT DOCUMENTS

| JP | 2003340436 A | * 12/2003 | .............. C02F 1/00 |
| JP | 2004169322 A | * 6/2004 | .............. E02D 3/10 |
| JP | 2006274576 A | * 10/2006 | .............. E02B 7/02 |

OTHER PUBLICATIONS

Translation of JP2003340436 (Year: 2003).*
Translation of JP2004169322 (Year: 2004).*
Translation of JP2006274576 (Year: 2006).*

* cited by examiner

*Primary Examiner* — Ekandra S. Miller-Cruz
(74) *Attorney, Agent, or Firm* — The Watson IP Group, PLC; Jovan N. Jovanovic

(57) ABSTRACT

A method and apparatus include a first impermeable side wall disposed within a ground and a second impermeable side wall disposed within the ground. The apparatus even further includes a third impermeable gate wall disposed within the ground, the third impermeable side wall including a third height that is shorter than both a first height and a second height of the first and second impermeable side walls, a first end of the third impermeable side wall being coupled to a second end of the first impermeable side wall, and a second end of the third impermeable side wall being coupled to the second end of the second impermeable side wall. The apparatus yet further includes a remedial permeable wall disposed atop the third impermeable gate wall, the remedial permeable wall including a fourth height, a first end of the remedial permeable wall being coupled to the second end of the first impermeable side wall, and a second end of the remedial permeable wall being coupled to the second end of the second impermeable side wall.

12 Claims, 3 Drawing Sheets

FUNNEL-AND-GATE WALL WITH A REPLACEABLE GATE WALL AND METHOD OF MAKING THE SAME

CROSS-REFERENCE TO RELATED APPLICATION

NA

BACKGROUND OF THE DISCLOSURE

1. Field of the Disclosure

The disclosure relates in general to a funnel-and-gate wall, and more particularly, to a funnel-and-gate wall with a replaceable gate portion and method of making the same.

2. Background Art

In-ground systems are used for a variety of purposes, such in-ground systems include in-ground trenches and walls. These in-ground systems can include ground fluid and product recovery trenches, seepage trenches/collection trenches, slurry walls and cement walls, permeable reactive barriers/full and gate systems, High Density Poly Ethylene (HDPE) barrier walls, underground alluvial fluid storage reservoir containment walls, cement footing foundations and "formless walls", etc. Large scale industrial trenchers have been developed that are able to dig trenches that are extremely deep (e.g., 125' feet or more below grade), these trenches being used to form such in-ground trenches and walls.

SUMMARY OF THE DISCLOSURE

The disclosure is directed to an apparatus comprising a first impermeable side wall disposed within a ground, the first impermeable side wall including a first height, a first end of the first impermeable side wall, and a second end of the first impermeable side wall. The apparatus further includes a second impermeable side wall disposed within the ground, the second impermeable side wall including a second height, a first end of the second impermeable side wall, and a second end of the second impermeable side wall. The apparatus even further includes a third impermeable gate wall disposed within the ground, the third impermeable side wall including a third height that is shorter than both the first height and the second height, a first end of the third impermeable side wall being coupled to the second end of the first impermeable side wall, and a second end of the third impermeable side wall being coupled to the second end of the second impermeable side wall. The apparatus yet further includes a remedial permeable wall disposed atop the third impermeable gate wall, the remedial permeable wall including a fourth height, a first end of the remedial permeable wall being coupled to the second end of the first impermeable side wall, and a second end of the remedial permeable wall being coupled to the second end of the second impermeable side wall.

In at least one configuration of the apparatus, a sum of the third height of the third impermeable gate wall and the fourth height of the remedial permeable wall is approximately equal to both the first height and the second height.

In at least one configuration of the apparatus, the third height of the third impermeable gate wall and the fourth height of the remedial permeable wall are approximately equal.

In at least one configuration of the apparatus, the first and second impermeable side walls and the third impermeable gate wall consist essentially of one of bentonite and cement, and bentonite.

In at least one configuration of the apparatus, the first and second impermeable side walls include a first length, and the third impermeable gate wall and the remedial permeable wall include a second length, the first length of the first and second impermeable side walls being greater than the second length of the third impermeable gate wall and the remedial permeable wall.

In at least one configuration of the apparatus, the remedial permeable wall is comprised of at least one of zero-valent metals, chelators, sorbents, and microbes.

In at least one configuration of the apparatus, the remedial permeable wall is replaceable and the remedial wall is a first remedial wall, the apparatus further including a second remedial permeable wall disposed atop the third impermeable gate wall, the second remedial permeable wall including a fifth height, the fifth height of the second remedial permeable wall being approximately equal to the fourth height of the first remedial permeable wall, and a first end of the second remedial permeable wall being coupled to the second end of the first impermeable side wall, and a second end of the second remedial permeable wall being coupled to the second end of the second impermeable side wall.

The disclosure is also directed to a method comprising disposing a first impermeable side wall within a ground, the first impermeable side wall including a first height, a first end of the first impermeable side wall, and a second end of the first impermeable side wall, and disposing a second impermeable side wall within the ground, the second impermeable side wall including a second height, a first end of the second impermeable side wall, and a second end of the second impermeable side wall. The method further includes disposing a third impermeable gate wall within the ground, the third impermeable side wall including a third height that is shorter than both the first height and the second height, a first end of the third impermeable side wall being coupled to the second end of the first impermeable side wall, and a second end of the third impermeable side wall being coupled to the second end of the second impermeable side wall. The method even further includes disposing a remedial permeable wall atop the third impermeable gate wall, the remedial permeable wall including a fourth height, a first end of the remedial permeable wall being coupled to the second end of the first impermeable side wall, and a second end of the remedial permeable wall being coupled to the second end of the second impermeable side wall.

In at least one configuration of the method, a sum of the third height of the third impermeable gate wall and the fourth height of the remedial permeable wall is approximately equal to both the first height and the second height.

In at least one configuration of the method, the third height of the third impermeable gate wall and the fourth height of the remedial permeable wall are approximately equal.

In at least one configuration of the method, the first and second impermeable side walls and the third impermeable gate wall consist essentially of one of bentonite and cement, and bentonite.

In at least one configuration of the method, the first and second impermeable side walls includes a first length, and the third impermeable gate wall and the remedial permeable wall include a second length, the first length of the first and second impermeable side walls being greater than the second length of the third impermeable gate wall and the remedial permeable wall.

In at least one configuration of the method, the remedial permeable wall is comprised of at least one of zero-valent metals, chelators, sorbents, and microbes.

In at least one configuration of the method, the remedial permeable wall is replaceable and the remedial wall is a first remedial wall. The method further comprises removing the first remedial permeable wall, and disposing a second remedial permeable wall atop the third impermeable gate wall, the second remedial permeable wall including a fifth height, the fifth height of the second remedial permeable wall being approximately equal to the fourth height of the first remedial permeable wall, and a first end of the second remedial permeable wall being coupled to the second end of the first impermeable side wall, and a second end of the second remedial permeable wall being coupled to the second end of the second impermeable side wall.

BRIEF DESCRIPTION OF THE DRAWINGS

The disclosure will now be described with reference to the drawings wherein.

DETAILED DESCRIPTION OF THE DISCLOSURE

Figure 1:
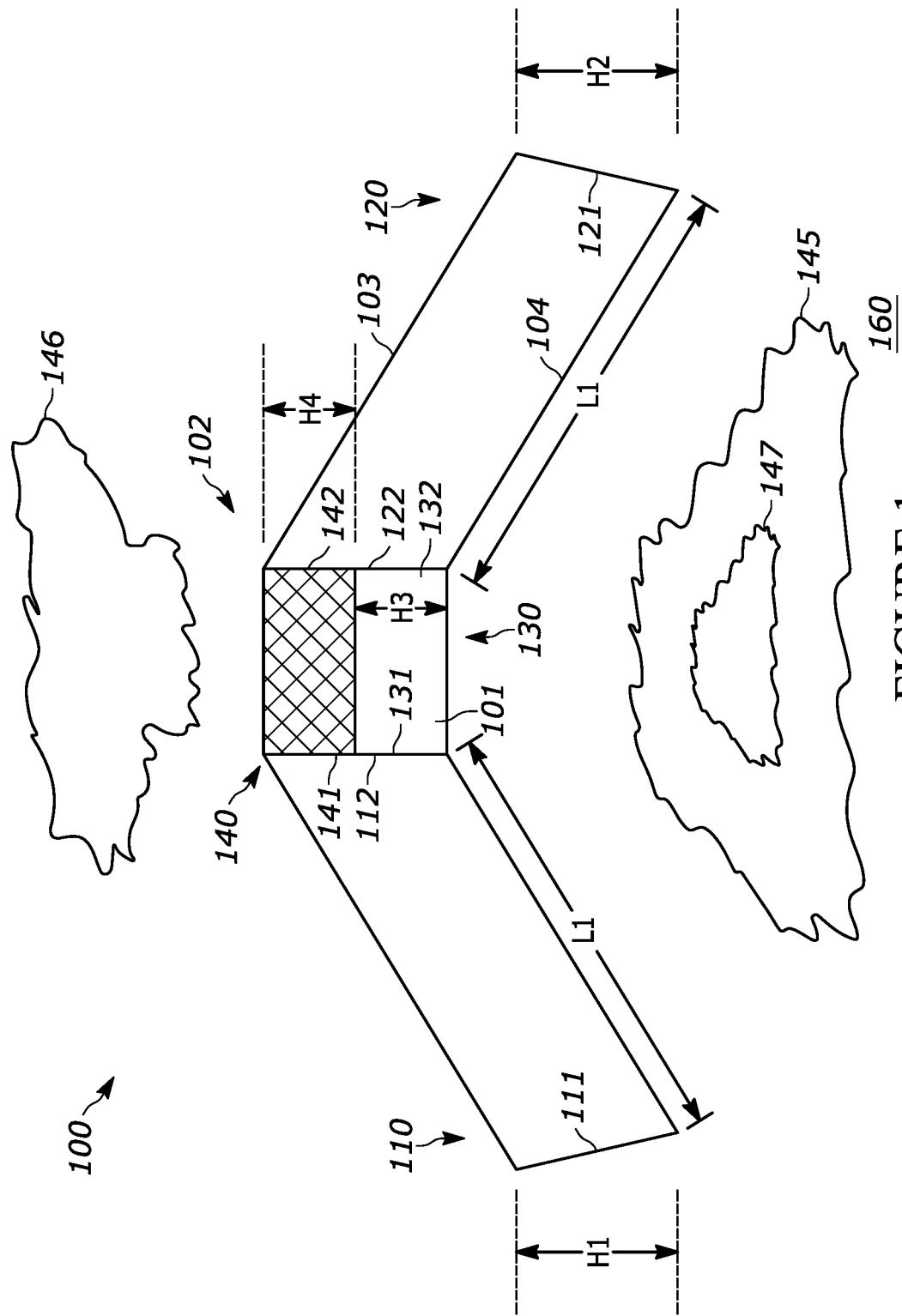
FIG. 1 illustrates a perspective view of an example funnel-and-gate wall, in accordance with at least one configuration disclosed herein.

While this disclosure is susceptible of configuration in many different forms, there is shown in the drawings and described herein in detail a specific configuration(s) with the understanding that the present disclosure is to be considered as an exemplification and is not intended to be limited to the configuration(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, an apparatus is disclosed, such as a funnel-and-gate wall 100. The funnel-and-gate wall 100 includes at least a first impermeable side wall 110, a second impermeable side wall 120, a third impermeable gate wall 130, and a remedial permeable wall 140. Although numerical prefixes are used to describe the various walls of the funnel-and-gate wall 100 described herein, the numerical prefixes are used only for descriptive distinction and not intended to represent any particular order that the wall are disposed within a ground, such as ground 160.

The first impermeable side wall 110 is also disposed within the ground 160. The first impermeable side wall 110 includes a first height H1, a first end 111, and a second end 112. Likewise, the second impermeable side wall 120 is disposed within the ground 160. The second impermeable side wall 120 includes a second height H2, a first end 121, and a second end 122.

The third impermeable gate wall 130 is likewise disposed within the ground 160. The third impermeable side wall 130 includes a third height H3. The third height H3 is shorter than both the first height H1 and the second height H2. The third impermeable side wall 130 further includes a first end 131 that is coupled to the second end 112 of the first impermeable side wall 110. The third impermeable side wall 130 even further includes a second end 132 that is coupled to the second end 122 of the second impermeable side wall 120. The term coupling as used herein includes a non-permeable connection between walls.

Figure 3:
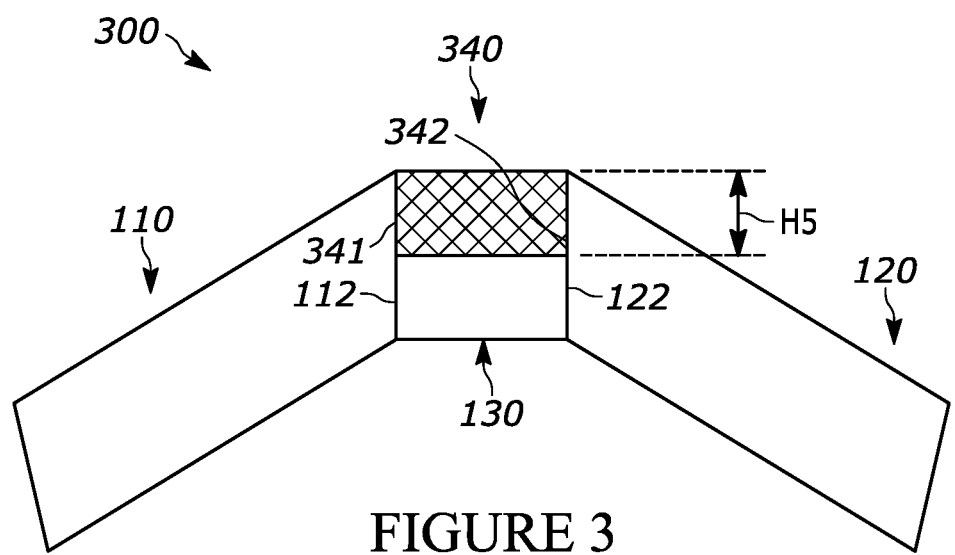
FIG. 3 illustrates a perspective view of another example funnel-and-gate formed from the funnel-and-gate wall shown in FIG. 2 with a second remedial permeable wall being deposited where a first permeable wall was removed, in accordance with at least one configuration disclosed herein.

The remedial permeable wall 140 is disposed atop the third impermeable gate wall 130. The remedial permeable wall 140 including a fourth height H4. The first end 141 of the remedial permeable wall 140 is coupled to the second end 112 of the first impermeable side wall 110, and a second end 142 of the remedial permeable wall 140 is coupled to the second end 122 of the second impermeable side wall 120. In at least one configuration, the first and second remedial permeable walls 140, 340 are a same height as the third impermeable gate wall 130 to which the first and second remedial permeable walls 140, 340 are coupled. The fourth height H4 of the remedial permeable wall 140 shown in FIG. 1, and remedial permeable wall 340 shown in FIG. 3, are less than the first and second impermeable side walls 110, 120. This smaller height H4 mitigates work needed to replace the remedial permeable wall 140 with a remedial permeable wall 340 (FIG. 3).

With this coupling of the first and second impermeable side walls 110, 120 with the third impermeable gate wall 130, as shown, a "V" shaped funnel-and-gate wall is formed. This "V" shaped funnel-and-gate wall directs a contaminated liquid 145, such as contaminated ground water, toward the remedial permeable wall 140. The remedial permeable wall 140 remediates this contaminated liquid 145 such that a contaminate 147 within the contaminated liquid 145 remains on a first side 101 of the funnel-and-gate wall 100 and uncontaminated liquid 146, such as uncontaminated water, gets disposed on a second side 102 of the funnel-and-gate wall 100 after having passed through the remedial permeable wall 140.

In at least one configuration, a sum of the third height H3 of the third impermeable gate wall 130 and the fourth height H4 of the remedial permeable wall 149 is approximately equal to both the first height H1 and the second height H2. This results in an approximately planar surface on both a top 103 and a bottom 104 of the funnel-and-gate wall 100, although other height(s) is/are possible that produce non-planar surfaces.

In at least one configuration, the third height H3 of the third impermeable gate wall 130 and the fourth height H4 of the remedial permeable wall 149 are approximately equal, as shown, although in other configurations the third height H3 of the third impermeable gate wall 130 and the fourth height H4 of the remedial permeable wall 140 can be unequal.

In at least one configuration, the first and second impermeable side walls 110, 120 and the third impermeable gate wall 130 consist essentially of bentonite and cement. In at least one other configuration, the first and second impermeable side walls 110, 120 and the third impermeable gate wall 130 consist essentially of bentonite. In at least one configuration, the remedial permeable wall 140 is comprised of such agents as zero-valent metals (such as zerovalent Iron), chelators (ligands selected for their specificity for a given metal), sorbents, microbes, and any other agent that provides for remediation for a particular contaminate.

The first and second impermeable side walls 110, 120 include a first length L1, and the third impermeable gate wall 130 and the remedial permeable wall 140 include a second length L2. In at least configuration, the first length L1 of the first and second impermeable side walls 110, 120 is greater than the second length L2 of the third impermeable gate wall 130 and the remedial permeable wall 140, although other lengths are possible. This difference in length produces the "V" shaped funnel-and-gate wall discussed above.

Figure 2:
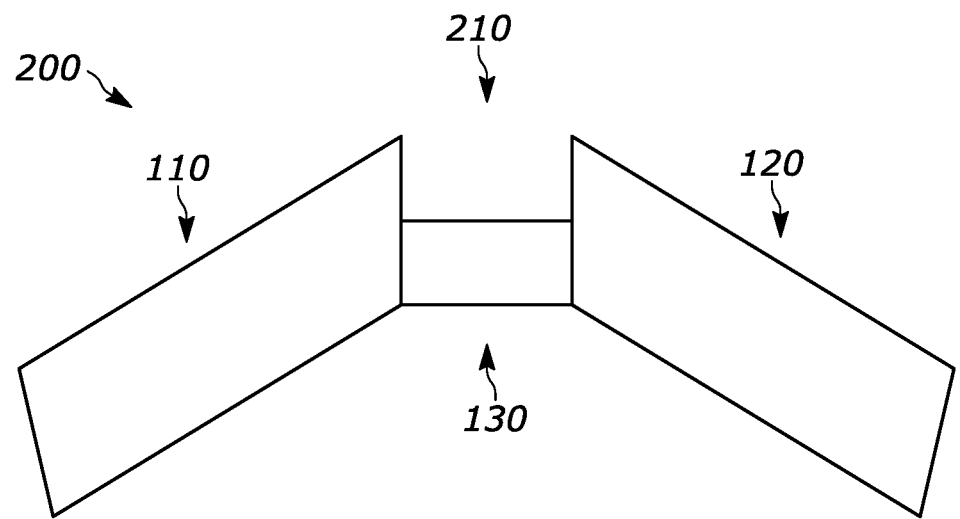
FIG. 2 illustrates a perspective view of the funnel-and-gate wall shown in FIG. 1 with a remedial permeable wall removed, in accordance with at least one configuration disclosed herein.

In at least one configuration, the remedial permeable wall 140 is replaceable, although in other configurations the remedial permeable wall 140 can be non-replaceable. With the configuration in which the remedial permeable wall 140 is replaceable, the remedial permeable wall 140 is a first remedial permeable wall that can be replaced with the second remedial permeable wall 340 that is disposed atop the third impermeable gate wall 130, as shown in FIG. 3. A new funnel-and-gate wall 300 is thereby formed with this second remedial permeable wall 340, referenced as funnel-and-gate wall 300. The second remedial permeable wall 340 including a fifth height H5. A first end 341 of the second remedial permeable wall 340 is coupled to the second end 112 of the first impermeable side wall 110. A second end 342 of the second remedial permeable wall 340 is coupled to the second end 122 of the second impermeable side wall 120. The funnel-and-gate wall 300 including the second remedial permeable wall 340 provides at least the same functionality as the funnel-and-gate wall 100 including the remedial permeable wall 140, described above. Although the walls 110-340 are shown in FIGS. 1-3 as being straight, such is an example. Any of the walls 110-340 can be curved, without departing from the scope of the configurations disclosed herein. Also, the walls 110-340 are disposed vertically, although other angles are possible.

To construct the funnel-and-gate walls 100, 200, 300, an example method is disclosed herein. The method includes disposing the first impermeable side wall 110 within a ground 160, and disposing the second impermeable side wall 120 within the ground 160. The method can further include disposing the third impermeable gate wall 130 within the ground 160, and disposing the remedial permeable wall 140 atop the third impermeable gate wall 130.

In at least one configuration of the method in which the remedial permeable wall 140 is replaceable, the remedial wall 140 is a first remedial wall. The method can further include removing the first remedial permeable wall 140, thereby forming an opening 210 in the funnel-and-gate wall 100 where the first remedial permeable wall 140 was previously disposed, as shown in FIG. 2, and disposing the second remedial permeable wall 340 atop the third impermeable gate wall 130.

Although the method of constructing the funnel-and-gate walls 100, 300 discussed above provides a specific order for disposing the impermeable walls 110-130 of the funnel-and-gate walls 100, 300, one skilled in the art would understand that such specific order is exemplary, and that the impermeable walls 110-130 of the funnel-and-gate walls 100, 300 can be disposed in any order, without departing from the scope of the configurations disclosed herein.

Figure 4:
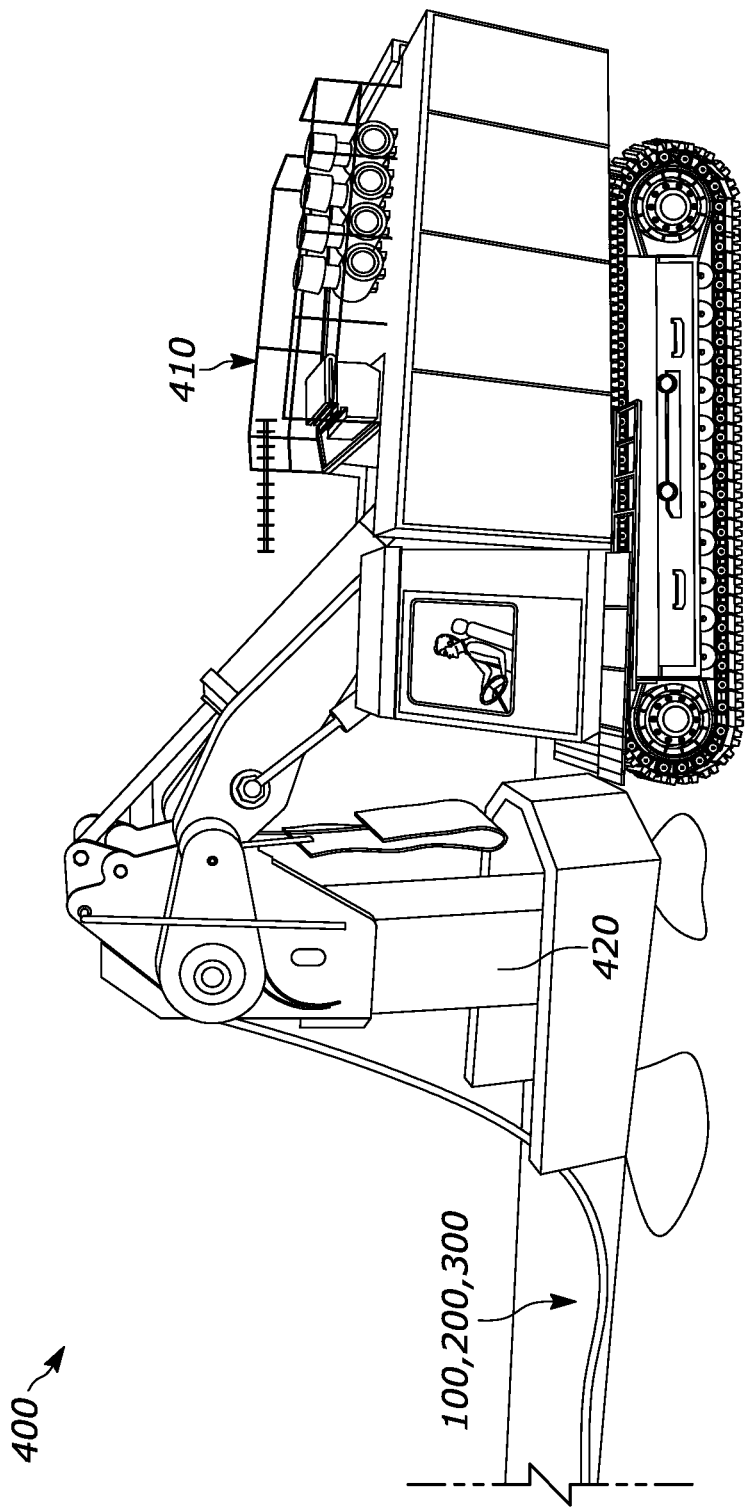
FIG. 4 illustrates an example system including an example ground excavator that can dispose and/or remove the walls shown in FIGS. 1-3, in accordance with at least one configuration disclosed herein.

FIG. 4 illustrates an example system 400 for producing the funnel-and-gate walls 100, 200, 300. The system 400 can include a ground excavator, such as a trencher 410, that can dispose and remove the walls 110-340, as discussed above in relation to FIGS. 1-3. The trencher 410 includes a trenching chain 420 that can be used to dispose and/or remove the walls 110-340, as disclosed herein. Thus, the trenching chain 420 can be configured with a length that substantially corresponds to the first and second remedial permeable walls 140, 340 such that the trencher 410 can be used to remove the first remedial permeable walls 140 and form the second remedial permeable walls 340. The trencher 410 can produce the funnel-and-gate walls 100, 200, 300 at depths that can range to greater than 100 feet within the ground 160.

The foregoing description merely explains and illustrates the disclosure and the disclosure is not limited thereto except insofar as the appended claims are so limited, as those skilled in the art who have the disclosure before them will be able to make modifications without departing from the scope of the disclosure. The approximations discussed above for various measurements can vary by +−10% without departing from the scope of the configurations disclosed.

What is claimed is:

1. An apparatus comprising:
a first impermeable side wall disposed within a ground, the first impermeable side wall including a first height, a first end of the first impermeable side wall, and a second end of the first impermeable side wall;
a second impermeable side wall disposed within the ground, the second impermeable side wall including a second height, a first end of the second impermeable side wall, and a second end of the second impermeable side wall;
a third impermeable gate wall disposed within the ground, the third impermeable gate wall including a third height that is shorter than both the first height and the second height, a first end of the third impermeable gate wall being coupled to the second end of the first impermeable side wall, and a second end of the third impermeable gate wall being coupled to the second end of the second impermeable side wall; and
a remedial permeable wall disposed atop the third impermeable gate wall, the remedial permeable wall including a fourth height, a first end of the remedial permeable wall being coupled to the second end of the first impermeable side wall, and a second end of the remedial permeable wall being coupled to the second end of the second impermeable side wall;
wherein the first and second impermeable side walls and the third impermeable gate wall consist essentially of one of bentonite and cement, and bentonite;
and wherein the first impermeable side wall, the second impermeable side wall, and the third impermeable gate wall are structurally configured to be disposed within the ground by a trencher.

2. The apparatus according to claim 1, wherein a sum of the third height of the third impermeable gate wall and the fourth height of the remedial permeable wall is approximately equal to both the first height and the second height.

3. The apparatus according to claim 1, wherein the third height of the third impermeable gate wall and the fourth height of the remedial permeable wall are approximately equal.

4. The apparatus according to claim 1, wherein the first and second impermeable side walls include a first length, and the third impermeable gate wall and the remedial permeable wall include a second length, the first length of the first and second impermeable side walls being greater than the second length of the third impermeable gate wall and the remedial permeable wall.

5. The apparatus according to claim 1, wherein the remedial permeable wall is comprised of at least one of zero-valent metals, chelators, sorbents, and microbes.

6. The apparatus according to claim 1, wherein the remedial permeable wall is replaceable and the remedial permeable wall is a first remedial wall, the apparatus further including a second remedial permeable wall disposed atop the third impermeable gate wall, the second remedial permeable wall including a fifth height, the fifth height of the second remedial permeable wall being approximately equal to the fourth height of the first remedial permeable wall, and a first end of the second remedial permeable wall being coupled to the second end of the first impermeable side wall, and a second end of the second remedial permeable wall being coupled to the second end of the second impermeable side wall.

7. A method comprising: disposing a first impermeable side wall within a ground, the first impermeable side wall including a first height, a first end of the first impermeable side wall, and a second end of the first impermeable side wall; disposing a second impermeable side wall within the ground, the second impermeable side wall including a second height, a first end of the second impermeable side wall, and a second end of the second impermeable side wall; disposing a third impermeable gate wall within the ground, the third impermeable gate wall including a third height that is shorter than both the first height and the second height, a first end of the third impermeable gate wall being coupled to the second end of the first impermeable side wall, and a second end of the third impermeable gate wall being coupled to the second end of the second impermeable side wall; and disposing a remedial permeable wall atop the third impermeable gate wall, the remedial permeable wall including a fourth height, a first end of the remedial permeable wall being coupled to the second end of the first impermeable side wall, and a second end of the remedial permeable wall being coupled to the second end of the second impermeable side wall; wherein the first and second impermeable side walls and the third impermeable gate wall consist essentially of one of bentonite and cement, and bentonite, and wherein the first and second impermeable sidewalls, the third impermeable gate wall, and the remedial permeable wall are disposed within the ground by a trencher.

8. The method according to claim 7, wherein a sum of the third height of the third impermeable gate wall and the fourth height of the remedial permeable wall is approximately equal to both the first height and the second height.

9. The method according to claim 7, wherein the third height of the third impermeable gate wall and the fourth height of the remedial permeable wall are approximately equal.

10. The method according to claim 7, wherein the first and second impermeable side walls includes a first length, and the third impermeable gate wall and the remedial permeable wall include a second length, the first length of the first and second impermeable side walls being greater than the second length of the third impermeable gate wall and the remedial permeable wall.

11. The method according to claim 7, wherein the remedial permeable wall is comprised of at least one of zero-valent metals, chelators, sorbents, and microbes.

12. The method according to claim 7, wherein the remedial permeable wall is replaceable and the remedial permeable wall is a first remedial wall, the method further comprising:

removing the first remedial permeable wall; and disposing a second remedial permeable wall atop the third impermeable gate wall, the second remedial permeable wall including a fifth height, the fifth height of the second remedial permeable wall being approximately equal to the fourth height of the first remedial permeable wall, and a first end of the second remedial permeable wall being coupled to the second end of the first impermeable side wall, and a second end of the second remedial permeable wall being coupled to the second end of the second impermeable side wall.

* * * * *